Patented Nov. 2, 1943

2,333,159

UNITED STATES PATENT OFFICE 2,333,159

MANUFACTURE AND USE OF NEW ORGANIC COMPOUNDS

Henry Dreyfus, London, England, assignor to Celanese Corporation of America, a corporation of Delaware No Drawing. Application October 28, 1938, Serial No. 237,468. In Great Britain November 20, 1937

4 Claims. (Cl. 260—461)

This invention relates to coloured cellulose ester and ether materials and to new dyes suitable for the production of such coloured products.

According to the present invention cellulose ester and ether materials are coloured with dyes containing a hydroxyl group, the said hydroxyl group being esterfied to an acid ester of an acid of phosphorus. The invention also includes the manufacture of new dyes containing such esterfied hydroxyl groups.

The dyes are conveniently applied as aqueous solutions of their water-soluble salts, e. g., water-soluble salts of alkali metals, ammonium or organic bases. Either dyeing methods or printing, padding or other mechanical impregnation methods may be used.

The dye can be of any series but of greatest importance are dyes of the azo series, dyes of the anthraquinone series, and dyes having nitro groups as the sole chromophores and particularly of this kind which contain two or more aryl nuclei linked directly, as in diphenyl and similar diaryl compounds or indirectly, e. g. through an oxygen atom, a sulphur atom or a —CH$_2$—, —CO— or —CO—NH— group, or an —NR— group (where R is a hydrogen or a substituent, e. g., alkyl). Preferably the acid ester groups are attached directly to alkyl groups as, for example, in the case of anthraquinone dyes, azo dyes and dyes containing two or more aryl groups linked together as described above, which contain hydroxy-alkyloxy or hydroxyalkylamino substituents the hydroxy groups of which are esterfied to acid esters of acids of phophorus. However, the acid ester groups may be attached directly to aryl nuclei as, for example, in the case of the acid esters of anthraquinone dyestuffs which contain hydroxyarylamino substituents and the acid esters of azo dyestuffs and dyestuffs containing two aryl groups linked together as described above which contain hydroxyaryl groups.

The acid ester may be an acid ester of orthophosphoric acid, phosphorous acid or other acid of phosphorus. Preferably the dyes contain only one acid ester group derived from an acid of phosphorus and are free from other acid groups.

The dyes may be made in various ways. Thus dyes which contain a hydroxyl group (e. g., as a hydroxylalkyloxy, hydroxyalkylamino or hydroxyarylamino group) may be treated so as to convert the hydroxy group into the desired acid ester group, or where the dyestuffs containing the hydroxyl groups can be formed from components one of which contains any of the above substituent groups or is itself a hydroxyl compound, such component or components may be treated so as to convert the hydroxy group into the desired acid ester group prior to the formation of the dyestuff.

The esterification is preferably effected by treatment with phosphorus oxychloride, phosphorus trichloride, phosphorus pentachloride, or an alkyl phosphoric acid chloride (e. g., ethyl phosphoric acid dichloride) or a corresponding bromine compound. A considerable excess of the phosphorus compound over that theoretically required is usually desirable. If desired, the esterification may be effected in the presence of an inert diluent, e. g., nitrobenzene or chlorbenzene. Further the presence of a tertiary nitrogen base, e. g., pyridine, quinoline, or dimethyl aniline, is often beneficial. The primary products of the reactions with phosphorus halogen compounds contain halogen which is split off when the said products are worked up with water.

As examples of dyes which may be esterified to acid esters of acids of phosphorus there may be mentioned the azo dyes obtainable by diazotising amines of the benzene series, e. g., aniline, the toluidines, the anisidines, the phenetidines and cresidine and their nitro and halogen derivatives, and coupling the diazo compounds obtained with N.hydroxyalkyl and N.alkylhydroxyalkyl derivatives of para-coupling aromatic amines, e. g., the N-($\beta$-hydroxyethyl) and N.ethyl-($\beta$-hydroxyethyl) - derivatives of aniline, m-toluidine, cresidine, m-alkoxy anilines, 2:5-dialkoxy-anilines, p-xylidine and $\alpha$-naphthylamine, or by coupling the diazo compounds with hydroxyalkyl derivatives of aromatic amines in which the hydroxyalkyl group is not attached to nitrogen, e. g., p-hydroxyethoxy-m-toluidine and similar compounds. There may also be mentioned the azo dyes obtainable by coupling, with amines or phenols, diazo derivatives of primary amines of the benzene series which have, as a nuclear substituent, a hydroxyalkoxy group or a hydroxyalkylamino group. As examples may be mentioned the azo dyes from diazotised p-($\beta$-oxyethoxy)-aniline and diethylaniline or other dialkyl-aniline.

Anthraquinone dyes for the esterification preferably contain amino or substituted amino groups in the 1 and/or 4 positions. As examples there may be mentioned 1-($\beta$-hydroxyethylamino)-anthraquinone, 1 - methylamino - 4 - ($\beta$-hydroxyethylamino) - anthraquinone, 1 - hydroxyethylamino-4-phenylamino-anthraquinone and 1-amino-4-p-hydroxyphenylamino-anthraquinone.

Suitable dyestuffs containing two or more aryl nuclei linked together are, for example, 2:4-dinitro-4'-(ethyl-$\beta$-hydroxyethylamino)-diphenylamine, 2:4-dinitro-4'-hydroxy-diphenylamine, 3-nitro-4-($\beta$-hydroxyethylamino)-diphenyl, and 1- benzoylamino-3-(β-hydroxyethylamino)-4-nitrobenzene.

Instead of forming the new dyestuffs by the direct action of an esterifying agent on a dyestuff containing an esterifiable hydroxy group, dyestuffs which contain an atom or group which is convertible into, or replaceable by, a hydroxyalkyl group the hydroxy group of which is esterified to an acid ester of an acid of phosphorus, may be treated so as to effect such conversion or replacement. Thus, for example, a dyestuff containing an amino group may be treated under alkaline conditions with an ω-halogen alkyl acid ester derived from an acid of phosphorus, e. g., β-chlor ethyl phosphorous acid or β-chlor-ethyl phosphoric acid.

The dyestuffs containing a hydroxy group esterified to an acid ester of an acid of phosphorus are of the greatest value for the colouration of cellulose acetate materials. Other esters and ethers of cellulose which may be coloured by means of them are cellulose formate, cellulose propionate, cellulose butyrate and the ethyl, butyl and benzyl ethers of cellulose. The dyestuffs can also be employed in the colouration of mixed materials comprising one or more of the aforesaid cellulose esters or ethers in admixture with other textile fibres, for example wool, silk and other animal fibres, or cotton, regenerated cellulose or other cellulosic materials. Such other fibres may be coloured by the same dyestuffs as the cellulose esters or ethers when they possess the requisite affinity or they may be coloured either in the same or different shades by means of other dyestuffs either before, after or simultaneously with the colouration of the cellulose esters or ethers.

The following examples illustrate the invention:

*Example 1*

30 parts of the dye p-nitro-benzene-azo-ethyl-(β-hydroxyethyl)-aniline are mixed with 400 parts of dry pyridine, and 30 parts of phosphorus oxychloride added slowly while stirring. The mixture is maintained at about 50° C. for a short time and then is carefully poured with good agitation into an ice-cold solution of 70 parts of anhydrous sodium carbonate and 1500 parts of water. After steam-distilling off the pyridine the sodium salt of the acid phosphoric ester obtained is separated from the aqueous liquid and dried.

A dyebath is prepared with 1 part of the acid phosphoric ester dyestuff obtained as described above, 2.5 parts of common salt and 2500 parts of water. 100 parts of cellulose acetate artificial silk are entered into this bath and the temperature raised to 70 to 75° C., which is maintained for one hour. The material is then removed from the bath, rinsed and dried. A scarlet shade is thus obtained.

Products can be made similarly from other hydroxy-alkylamino-azo dyes and used to dye cellulose acetate. For example there may be prepared and used the product from p-nitro-benzene-azo-ethyl-(β-hydroxyethyl)-m-toluidine and phosphorus oxychloride, or the product from 2-chlor-4-nitro-benzene-azo-ethyl-(β-hydroxyethyl)-aniline and phosphorus oxychloride, or the product from p-(β-hydroxy-ethoxy)-benzene-azo-diethyl aniline and either phosphorus oxychloride or phosphorus trichloride.

*Example 2*

30 parts of 2:4-dinitro-4'-(ethyl-β-hydroxyethylamino)-diphenylamine are treated with 30 parts of phosphorus oxychloride and 400 parts of pyridine in the manner described in Example 1. The product when applied from an aqueous dyebath in the manner described in Example 1 yields golden yellow shades on cellulose acetate.

In a similar manner an acid phosphoric ester can be prepared from 4-chlor-2-nitro-4'-(ethyl-β-hydroxyethyl-amino)-diphenylamino and used to dye cellulose acetate in golden yellow shades.

*Example 3*

1 part of 2:4-dinitro-4'-(ethyl-β-hydroxyethyl-amino)-diphenylamine is mixed with four times its weight of phosphorus trichloride and the mixture kept at about 50° C. for a short time. The product is then poured into a mixture of water and ice and the precipitated acid phosphorus ester filtered off. It is then converted into a sodium salt by dissolving in a dilute aqueous solution of sodium carbonate and salting out the product.

100 parts of cellulose acetate are dyed in a dyebath prepared with 1 part of the sodium salt of the phosphorous ester, 2.5 parts of common salt and 2500 parts of water. Dyeing is conducted for one hour at 70 to 75° C. A golden yellow shade is obtained.

*Example 4*

A dyebath is prepared from 2500 parts of water, 1 part of common salt and 1 part of the sodium salt of the acid phosphoric ester of 1-β-hydroxyethylamino - 4 - phenylamino - anthraquinone (obtainable by acting on 1-β-hydroxyethylamino-4-phenylamino-anthraquinone with its own weight of phosphorus oxychloride in the presence of ten times its weight of pyridine, pouring into an aqueous solution of sodium carbonate and steam-distilling off the pyridine). 100 parts of cellulose acetate artificial silk are dyed in this dyebath for one hour at 70 to 75° C. A blue shade is thus obtained.

Blue shades are likewise obtained with the acid phosphoric ester obtained by the action of phosphorus oxychloride on 1-methylamino-2-(hydroxy - ethoxy) - 4 - phenylamino - anthraquinone.

*Example 5*

100 parts of cellulose acetate are dyed in the manner described in Example 4 but substituting for the phosphoric ester therein specified 1 part of the phosphorous ester obtainable by warming 1 - β - hydroxy - ethylamino - 4 - phenylamino-anthraquinone with five times its weight of phosphorus trichloride at 60° C., treating the reaction mixture with water and converting the product into its sodium salt. Blue shades are obtained.

Having described my invention, what I desire to secure by Letters Patent is:

1. A diphenylamine dye containing a nitro group as the sole chromophore, and having directly attached to one of the benzene nuclei of the diphenylamine a hydroxyalkylamino radicle of which the hydroxyl group is esterified to an acid ester of an acid of phosphorus.

2. An acid phosphoric ester of 2:4-dinitro-4'-(ethyl - beta - hydroxyethylamino) - diphenylamine.

3. An acid phosphorus ester of 2:4-dinitro-4'-(ethyl - beta - hydroxyethylamino) - diphenylamine.

4. An acid phosphoric ester of 4-chlor-2-nitro-4' - (ethyl - beta - hydroxyethyl - amino - diphenylamine).

HENRY DREYFUS.